United States Patent [19]

Urayama

[11] Patent Number: 4,916,566

[45] Date of Patent: Apr. 10, 1990

[54] MAGNETIC TAPE CASSETTE WHICH AVOIDS FLANGE/HOUSING CONTACT

[75] Inventor: Kiyoshi Urayama, Miyagi, Japan

[73] Assignee: Sony Corporation, Tokyo, Japan

[21] Appl. No.: 208,770

[22] Filed: Jun. 20, 1988

[30] Foreign Application Priority Data

Jul. 14, 1987 [JP] Japan ................... 62-108001

[51] Int. Cl.[4] ............................................. G11B 23/02
[52] U.S. Cl. ....................................... 360/132; 242/197
[58] Field of Search ................. 360/132; 242/197–200; 226/387, 389

[56] References Cited

U.S. PATENT DOCUMENTS

| | | | |
|---|---|---|---|
| 3,620,477 | 11/1971 | Penn | 242/197 |
| 3,620,478 | 11/1971 | Fitzgerald et al. | 242/197 |
| 4,316,589 | 2/1982 | Stranders | 242/197 |
| 4,452,407 | 6/1984 | Ogata et al. | 242/199 |
| 4,452,408 | 6/1984 | Sasaki | 242/197 |
| 4,541,581 | 9/1985 | Hara | 360/132 |
| 4,706,149 | 11/1987 | Machida et al. | 360/132 |

FOREIGN PATENT DOCUMENTS 0150987 8/1985 European Pat. Off. .
61-140491 8/1986 Japan .

*Primary Examiner*—Stuart N. Hecker
*Assistant Examiner*—David J. Severin
*Attorney, Agent, or Firm*—Ronald P. Kananen

[57] ABSTRACT

A magnetic tape cassette comprising a tape reel having a lower flange with an annular guide projection on a bottom surface thereof and a cassette casing including a lower housing portion with an annular guide portion on the inner surface thereof for limiting play of the tape reel within the cassette casing in any directions of the tape reel assemblies. Dust is generated only at a contacting section between surfaces of the annular projection and the annular recess portion. The dust, therefore, tends to fall out of circular openings of the lower housing portion, and since the edges of the flanges are prevented from coming into contact with the interior surface of the casing, no dust is formed within the cavity in which the tape is disposed; thus damage to the tape is avoided.

14 Claims, 4 Drawing Sheets

MAGNETIC TAPE CASSETTE WHICH AVOIDS FLANGE/HOUSING CONTACT

BACKGROUND OF THE INVENTION

1. Field of the Invention

The present invention relates generally to a magnetic tape cassette, particularly to a magnetic tape cassette comprising a tape reel having upper and lower flanges and a magnetic tape cassette casing formed of upper and lower housings. More particularly, the invention relates to a structure for preventing dust from being produced by friction between the flanges and the housings.

2. Description of the Prior Art

Magnetic tape cassettes including two magnetic tape reels and a magnetic tape casing are common.

Conventionally, in such magnetic tape cassettes, the tape reel assembly consists of a cylindrical drum section having upper and lower reel flanges integrally attached onto upper and lower faces thereof, respectively, and the casing consists of upper and lower housings. The lower flange has a cylindrical hub section projecting from the outer surface thereof and comprises a substantially cylindrical recess for receiving a reel shaft of a recording and/or reproducing apparatus. The tape reel is rotatably received within a circular opening formed in the lower housing through the cylindrical hub section. A clearance between the outer peripheral surface of the cylindrical hub section and the inner peripheral surface of the circular opening is standard among tape cassette manufacturers. Since the alignment of the reel shaft may vary slightly between cassette players, the clearance is necessary in order to assure the smooth rotation of the tape reel assembly without friction between the hub section and the circular opening formed in the cassette case for receiving it. The clearance is referred to as a "G spec.".

However, in such a magnetic tape cassette, the bosses of the tape reels are often caused, due to vibration or shocks, to come out of the respective openings of the lower housing and, as a result, dust is produced by the friction between the edges of the upper and lower flanges and inner walls of the housing.

Thus, in conventional tape cassettes, the degree of play of the tape reel perpendicular to the center axis thereof is either defined by the clearance between the edges of the upper and lower flanges of the tape reel and the inner surfaces of side wall of the housing, or defined by the clearance between the inner periphery of the circular opening and the corresponding hub section of the reel assembly.

Recently, magnetic tape cassettes with provisions for preventing the bosses of the tape reels from coming out of the respective openings of the lower housing have been proposed.

One such magnetic tape cassette has been disclosed in the Japanese Utility Model First Publication (Jikkai) Showa No. 61-140491. This magnetic tape cassette includes an inwardly extending annular projection in the periphery of the circular opening of its lower housing, for preventing the bosses of the tape reel assemblies from coming out of the respective openings in the lower housing, and for preventing fracturing of the upper flange. In such magnetic tape cassettes, there is a problem in that, since the reels are supported and guided near the central axes thereof, they can easily become inclined, with the result that the bosses come out of the hole in the lower half of the casing and the reel becomes free to slide around the inside of the cassette casing. Another result of the inclination is that the flanges impinge at their outer edges upon the upper and/or lower inner surfaces of the casing, with the result that they may become cracked near the hubs.

SUMMARY OF THE INVENTION

Therefore, it is an object of the disclosed invention to provide a magnetic tape cassette in which movement of the reels within a cassette casing is regulated in both axial and radial directions, and in which the reels cannot, under ordinary conditions, come out of their guides.

Another object of the invention is to provide a magnetic tape cassette in which dust cannot be generated by friction between edges of flanges of the tape reel assembly and an inner wall of the cassette casing, and wherein the flanges of the tape reels cannot impinge on the inner surfaces of the side walls of the cassette casing and generate dust and debris.

A further object of the invention is to provide a tape cassette wherein the reels are prevented from becoming inclined within the cassette casing so as to prevent excessive stress on the flanges at the portions thereof near the hubs.

A still further object of the immediate invention is to provide a tape cassette wherein dust generated due to friction between the reels and the cassette casing is caused to fall outside of the cassette casing and is prevented from entering the internal space thereof.

In order to accomplish the aforementioned and other objects, a magnetic tape cassette according to the present invention, comprises a tape reel being rotatable about its axis for receiving a tape, formed with a cylindrical drum and upper and lower flanges radially extended from respective end surfaces of said drum, a housing defining a space for enclosing said tape reel and comprised of upper and lower housing portions, and guide means for limiting movement of said tape reel within said space in any direction, said guide means including a first contact portion projecting from a lower face of said lower flange and a second guide portion disposed on an inner surface of said lower housing portion for receiving said first contact portion.

An alternative form of this invention comprises a tape reel being rotatable around its axis for receiving a tape, formed with an upper flange and a lower flange having an axially extending cylindrical hub portion projecting downwardly from a bottom face of the lower flange and a cylindrical drum section being disposed between the upper and lower flanges, a housing for enclosing the tape reel, the housing including upper and lower housing portions defining an internal space between the housing portions and the tape reel, the lower housing portion having a circular opening for exposing the cylindrical hub, and means for preventing contact between the tape reel and the inner wall of the housing, the means including a first contact portion, separate from the hub portion, disposed on the bottom face of the lower flange and a second contact portion disposed on an inner wall of the housing for mating with the first contact portion, wherein an inner periphery of the second contact portion is larger than that of the circular opening.

According to this invention, the first and second contact portions can cooperatively serve so as to limit the movement of the tape reel within the cassette casing in both axial and radial directions. Moreover, according to the invention, the second contact portion formed on the inside lower half thereof supports a relatively large area of the lower flange of the tape reel means. Further, according to the invention, mating surfaces of the first contact portion formed on the lower flange of the tape spool and the second contact portion formed on the lower half of the cassette casing cooperate to form a barrier against dust created due to friction, so as to prevent it from entering the interior of the cassette casing and becoming attached the tape disposed therein.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

In the drawings.

DESCRIPTION OF THE PREFERRED EMBODIMENT

The present invention will be described with reference to the accompanying drawings of the preferred embodiment of the invention.

Figure 1:
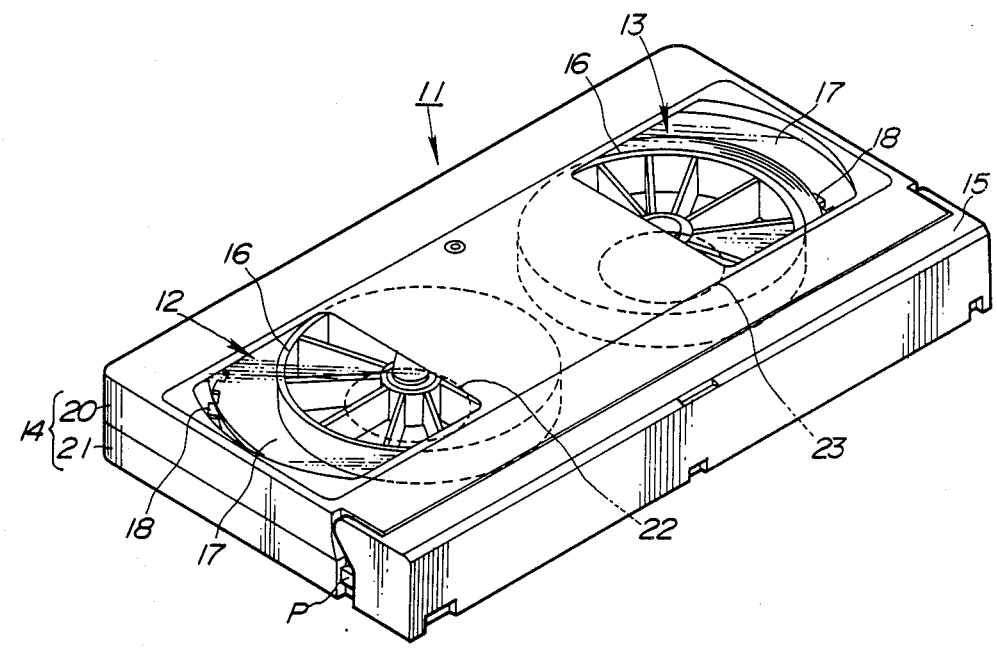
FIG. 1 is a perspective view of illustrating the upper side of the magnetic tape cassette according to the invention.
Figure 2:
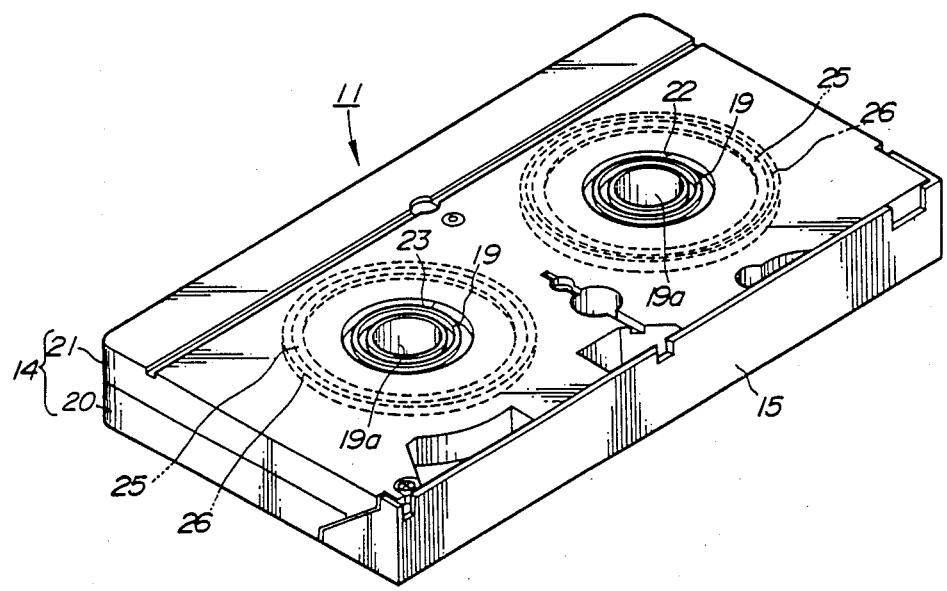
FIG. 2 is a perspective view illustrating the lower side of the magnetic tape cassette according to the invention.

Referring now to the drawings, FIGS. 1 and 2 represent a tape cassette 11 according to the invention which is formed with a pair of tape reels 12, 13 and a substantially rectangular cassette housing 14. The pictured tape cassette 11 contains 8-mm video tape.

The respective tape reels 12, 13 comprise upper and lower flanges 17, 18 and a cylindrical drum section 16, and are rotatably retained side by side in the rectangular cassette housing 14. The tape T is wound on these tape reels. The cassette housing 14 is formed with upper and lower housing portions 20 and 21. The tape cassette 11 includes a lid assembly 15 which is pivotably mounted on the housing 14 so as to be operable between open and closed mode positions. When the lid assembly 15 is open, the segment of the tape between the tape reel assemblies 12 and 13 is exposed for withdrawal from the cassette housing 14. On the other hand, when the lid is in the closed position, it encloses the tape T. While the tape cassette 11 is not inserted into the drive device of the video tape recorder, a lock-pin P remains in a lock mode. While the tape cassette 11 is inserted into the drive device, the lock-pin P is positioned in an unlock mode, with the result that the lid assembly 15 can be opened.

In FIGS. 1 and 2, reference numeral 19 shows a cylindrical hub section which is formed in the center of the lower flange 18 and protrudes from the bottom face of the flange 18. The inner peripheral wall of the cylindrical hub section 19 defines a cylindrical recess 19a into which a reel shaft (not shown) of a recording and/or reproducing apparatus is inserted. The lower housing portion 21 includes a pair of circular openings 22 and 23 through which the reel shaft is inserted into the cylindrical hub section 19.

Figure 3:
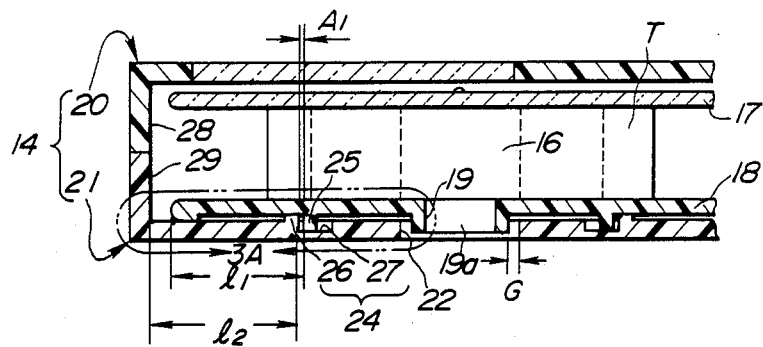
FIG. 3 is a partial cross sectional view showing the essential parts of the magnetic tape cassette of the preferred embodiment according to the invention.
Figure 4:
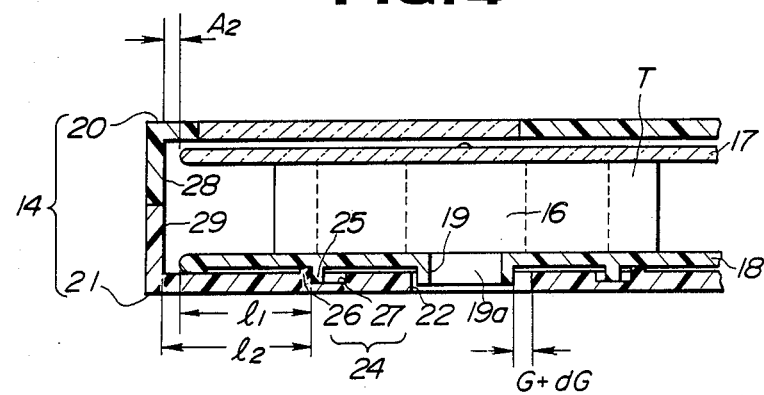
FIG. 4 is a partial sectional view of the essential parts of the magnetic tape cassette as shown in FIG. 3.

FIGS. 3 and 4 are sectional views of the preferred embodiment of the invention illustrating the relationship of the lower flange 18 to the lower housing portion 21.

In FIG. 3, an annular projection 25 is formed on the bottom face of the lower flange 18 around the cylindrical hub section 19. The center axis of the annular projection 25 is that of the tape reel. The lower housing portion 21 includes an annular projection 26 and an annular groove 27, which limit motion of the tape reel assembly within the cassette housing 14. The inner diameter of the annular projection 26 is slightly larger than the outer diameter of the annular projection 25. The clearance $A_1$ between the annular projection 25 and the annular projection 26 is smaller than the clearance G between the outer peripheral surface of the cylindrical hub section 19 and the inner peripheral surface of the circular opening 22. The clearance G defines the so-called "G spec.".

Figure 3A:
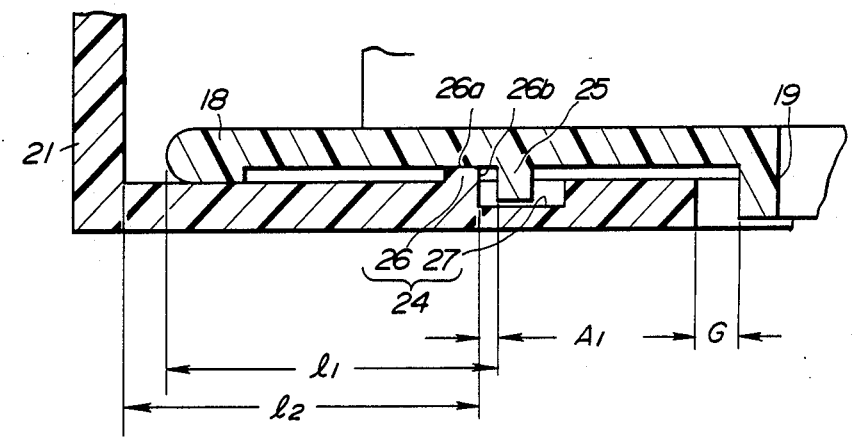
FIG. 3A is an enlarged cross sectional view of the section enclosed by the chain line in FIG. 3.

In FIG. 3A, an upper face 26a of the annular projection 26 supports the bottom face of the lower flange 18 before inserting the tape cassette 11 into the recording and/or reproducing apparatus. An inner peripheral surface 26b of the annular projection 26 limits motion of the tape in radial directions, with the result that the upper and lower flanges 17 and 18 are prevented from colliding with the side walls 28 and 29 of the upper and lower housing portion 20 and 21, respectively. In addition, the annular projection 25 fits into the annular groove 27 so as not to come out of the latter. In this way, a contact portion 24 formed by the annular projection 26 and the annular groove 27 cooperates with the annular projection 25 of the flange 18 to limit play of the tape reel within the cassette housing 14 in any direction.

In FIG. 3, the center axis of the tape reel assembly 12 is aligned with that of the circular opening 22 of the lower housing portion 21.

In other words, the reel 12 is centered in the circular hole 22.

In FIG. 4, the reel 12 is shown displaced in the direction of the side walls 28 and 29, the center axis of the tape reel is displaced from that of the circular opening 22 formed in the lower housing portion 21 by the maximum displacement (dG). In FIGS. 3, 3A, and 4, a distance $\chi_1$ between the outer peripheral surface of the annular projection 25 and the edge of the lower flange 18 is set to be smaller than a distance $\chi_2$ between the inner peripheral surface 26b of the annular portion 26 and the side walls 28 and 29 of the cassette housing 14. As will be seen clearly in FIG. 4, a predetermined difference $A_2$ between the distances $\chi_1$ and $\chi_2$ is provided. Thus, the outer peripheral surface of the annular projection 25 mates with the inner peripheral 26b of the annular portion 26 so that the tape reel assembly 12 cannot come into contact with the side wall of the cassette housing 14.

In prior art magnetic tape cassettes, the edges of the upper and lower flanges may often come into contact with a side wall of cassette housing, with the result that dust or debris is generated due to friction between the edges of the flanges and the side wall of the cassette housing during shipping and handling. The dust and debris tend to adhere to the surface of the tape, and the surface of the tape is, obviously, quite susceptible to damage therefrom. As a result, the magnetic substance on the surface of the magnetic tape is subject to shear fracture. Such damage to the magnetic tape may result in a so-called dropout error due to failure in the magnetic substance, that is to say, the tapes are not dependable for use as a high quality recording medium.

In the construction of the tape cassette of the preferred embodiment of the invention, the play of the tape reel in the radial direction is regulated by an annular projection on the lower flange and an annular recess portion of the lower housing portion. Therefore, the outer peripheral surface of the annular projection can contact the inner peripheral surface of the annular portion so that the edges of the upper and lower flanges cannot collide or mate with the side wall of the cassette housing. Dust may be created by friction between the annular projection and the annular recess portion; however, it is separated from the cylindrical drum section in which magnetic tape is wound, and is nearer to the circular opening of the cylindrical hub section. As a result, the dust or debris tends to come out through the circular opening. In this way, the dust and debris may not be caused by friction or collision between the edges of flanges of the tape reels and the inside of the cassette tape housing, and any dust that is caused by friction between the annular projection of the lower flange and the annular portion of the lower housing portion cannot easily reach the tape wound around the cylindrical drum section. Thus, the tape of the cassette according to the present invention has a greatly reduced tendency to become damaged due to dust.

Among the materials most suitable for the annular projection 25 and the annular portion 26 are synthetic resins having good wear and abrasion resistance, such as an acrylonitrile-butadiene-styrene (ABS). In this case, the synthetic resins having abrasion resistance may be used in constructing the annular projection 25 and/or the annular portion 26, or the entire lower flange 18 and/or the entire lower housing portion 21.

As will be appreciated from the above, the tape cassette of the disclosed embodiment of the invention can help prevent dropout due to dust.

Although the present invention has been disclosed in terms of VTR tape cassettes, it is not intended to limit the scope of the invention to such magnetic tape cassettes. The invention may be embodied in other specific forms without departing from the spirit or essential characteristics thereof. Therefore, the invention should be understood in all respects as defined by the appended claims rather than by the foregoing description and all modifications which come within the meaning and range of equivalency of the claims are therefore intended to be embraced therein.

What is claimed is:

1. A magnetic tape cassette comprising:
    a tape reel being rotatable about its axis for receiving a tape, formed with at least a cylindrical drum and a flange radially extending from one end of said drum;
    a housing defining a space for enclosing said tape reel, said housing having a first inner surface opposing the surface of said flange which faces away from said drum and a second inner surface perpendicular to said first inner surface;
    means for limiting radial displacement of said tape reel within said space to maintain a required distance between the outer circumference of said flange and the respective opposing second inner surface of said housing;
    said means including a first contact portion which projects from the surface of said flange facing away from said drum and has an essentially cylindrical outer peripheral surface coaxially arranged about said axis substantially midway between the perimeter of said flange and the central section of said flange, and a second contact portion which is disposed on said first inner surface of said housing and has an essentially cylindrical inner peripheral surface abutting said outer peripheral surface of said first contact portion so as to limit the radial displacement of said tape reel; and
    whereby contact between the outer circumference of said flange and the respective opposing second inner surface of said housing is prevented.

2. A magnetic tape cassette as set forth in claim 1, wherein said second contact portion includes a radially extending surface for receiving the surface of said flange facing away from said drum.

3. A magnetic tape cassette as set forth in claim 1, wherein said first contact portion and/or said second contact portion are annular in shape and said first and second portions are coaxially arranged with said axis.

4. A magnetic tape cassette as set forth in claim 3, wherein said first contact portion is square in cross section.

5. A magnetic tape cassette as set forth in claim 3, wherein said second contact portion consists of an annular projection and an annular groove which abuts the inner peripheral surface of said annular projection and receives said first contact portion therein.

6. A magnetic tape cassette as set forth in claim 6, wherein said annular projection is square in cross section.

7. A magnetic tape cassette as set forth in claim 5, wherein said annular groove is square in cross section.

8. A magnetic tape cassette comprising:
    a tape reel being rotatable about its axis for receiving a tape, formed with a cylindrical drum, a first flange and a second flange having an axially extending cylindrical hub projecting from the surface of said second flange facing away from said drum;
    a housing defining a space for enclosing said tape reel, said housing including a first half and a second half having a circular opening for exposing said cylindrical hub;
    means for limiting radial displacement of said tape reel within said space to maintain a required distance between the outer circumference of said flanges and the respective opposing inner surface of said housing;
    said limiting means including a first contact portion which projects from the surface of said second flange facing away from said drum and has an essentially cylindrical outer peripheral surface coaxially arranged about said axis substantially midway between the perimeter of said second flange and said hub, and a second contact portion which is disposed on an inner surface of said second half opposing the surface of said second flange facing away from said drum and has an essentially cylindrical inner peripheral surface abutting said outer peripheral surface of said first contact portion so as to limit the radial displacement of said tape reel; and whereby contacts between the outer circumference of said flanges and the respective opposing inner surface of said housing and the inner circumference of said circular opening and the outer peripheral surface of said hub are prevented.

9. A magnetic tape cassette as set forth in claim 8, wherein said second contact portion includes a radially extending surface for receiving the surface of said second flange facing away from said drum.

10. A magnetic tape cassette as set forth in claim 8, wherein said first contact portion and/or said second contact portions are coaxially arranged with said axis.

11. A magnetic tape cassette as set forth in claim 10, wherein said first contact portion is square in cross section.

12. A magnetic tape cassette as set forth in claim 10, wherein said second contact portion consists of an annular projection and an annular groove which abuts the inner peripheral surface of said annular projection and receives said first contact portion therein.

13. A magnetic tape cassette as set forth in claim 12, wherein said annular projection is square in cross section.

14. A magnetic tape cassette as set forth in claim 12, wherein said annular groove is square in cross section.

* * * * *